United States Patent Office 2,718,173
Patented Sept. 20, 1955

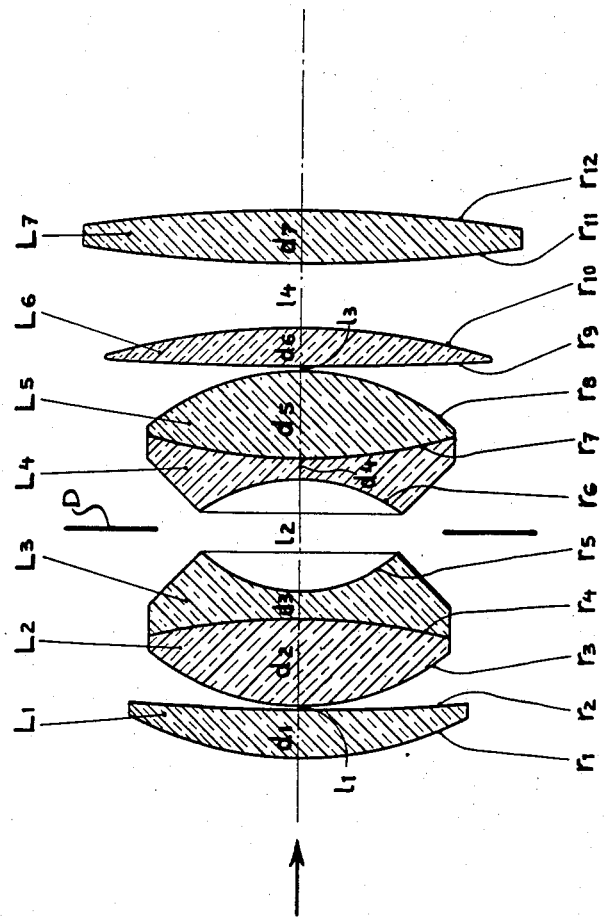

2,718,173

HIGH INTENSITY FIVE COMPONENT PHOTOGRAPHIC OBJECTIVE

Dionisie Hacman, Grenchen, Switzerland, and Günter Klemt, Kreuznach, Germany, assignors to Cycloptic Anstalt fur Optik und Mechanik, Vaduz, Liechtenstein Application September 13, 1951, Serial No. 246,394

Claims priority, application Switzerland September 26, 1950

10 Claims. (Cl. 88—57)

This invention relates to high intensity objectives with increased image brightness.

An object of the invention is to reduce the light losses in objectives at increased relative openings.

A further object is to produce a lens objective of the two subassembly type for photographic purposes, as also other uses, which while retaining the advantages resulting from correction of aberrations gives a more uniform and increased light distribution at the image.

High intensity objectives in which the various aberrations, for example, chromatic, spherical, coma, distortion and astigmatism have been corrected, and comprising an object- and an image-side subassembly in which the principal rays of all inclinations together with their pencils of rays incident upon the object-side subassembly are bent from their incident inclinations towards the optical axis by the image-side partial assembly, the principal rays emerging form the image-side assembly parallel, or substantially so, to the optical axis, are known. From the standpoint of optics, these objectives have the advantage that the losses in brightness, which in normal, prior known objectives at a relative opening of f:2 and a field of view of 46 degrees amounted to about 75% of the image brightness at the optical axis, are very markedly reduced, and for parallel emergence of the principal rays from the image-side subassembly, are practically eliminated.

We have discovered, as the result of theoretical considerations and our computations, that with objectives of such two subassembly type, with a relative opening above 1:2.3 particularly excellent results, in respect of both the image brightness and of the correction relationships, are obtained if the image-side sub-assembly has both a definite constitution and arrangement of the individual elements making up such subassemblies.

We accomplish the foregoing, and other objects, by having our image-side subassembly consist of at least two, air isolated, positive lenses in front of which are inserted two meniscus shaped, air isolated, negative lenses of which the concave surfaces of the menisci face each other. In addition, the distance between the object-side subassembly and the front positive lens of the image-side subassembly, measured from the vertex of the lens surface of the object-side subassembly nearest the image plane to the vertex of the surface of the front positive lens of the image-side subassembly nearest the object-side assembly, is made more than 60% of the focal length of the whole lens system, while the distance from the front lens to the rear positive lens of the image-side subassembly is made less than 25% of such focal length. Furthermore, the focal length of each of the two positive lenses of the image-side subassembly is made to differ by less than 20% from twice the focal length of the whole lens system of our objective.

In the drawing is shown an illustrative embodiment of the objective of our invention having the required constitution and arrangement of the individual elements. The object-side subassembly comprises a single positive lens L1, but may consist of two or more lenses of which one or more may be cemented to each other. The image-side subassembly comprises successively the two meniscus-shaped negative lenses, L2L3 and L4L5, positioned to either side of the iris diaphragm D and with their hollow concave surfaces facing each other, and the two positive lenses L6 and L7. In the illustrative embodiment, the negative lenses each comprise two individual lenses cemented to each other but each may be a single lens. The optical details for the illustrative embodiment are given in the following table, in which $r$(subscript) are the radii of the successive lens surfaces in millimeters, $d$(subscript) the lens thicknesses in mm., $l$(subscript) the spacings in mm., $N_D$ the indices of refraction, V the Abbe numbers, and $\phi$ the diameters of the respective lenses:

|  |  | $N_D$ | V | $\phi$ |
|---|---|---|---|---|
| $r_1 = + 70.7$ | $d_1 = 9.05$ | 1.658 | 50.8 | 62.0 |
| $r_2 = +435.0$ | $l_1 = 0.60$ |  |  |  |
| $r_3 = + 45.35$ | $d_2 = 16.50$ | 1.620 | 60.3 | 54.8 |
| $r_4 = -122.9$ | $d_3 = 4.80$ | 1.607 | 40.2 |  |
| $r_5 = + 27.92$ | $l_2 = 21.10$ |  |  |  |
| $r_6 = - 32.45$ | $d_4 = 4.20$ | 1.593 | 35.4 | 56.0 |
| $r_7 = +104.2$ | $d_5 = 16.25$ | 1.623 | 56.9 |  |
| $r_8 = - 45.76$ | $l_3 = 0.60$ |  |  |  |
| $r_9 = +591.0$ | $d_6 = 7.80$ | 1.658 | 50.8 | 72.7 |
| $r_{10} = -129.5$ | $l_4 = 11.90$ |  |  |  |
| $r_{11} = +290.0$ | $d_7 = 10.25$ | 1.658 | 50.8 | 82.0 |
| $r_{12} = -275.8$ |  |  |  |  |

Focal length of total system 100 mm., image distance 40.0 mm., and image diagonals 83 mm.

Testing the above data in the light of our discovery of the applicable requirements, we find that in the illustrative embodiment (a) the distance from L1 to L6 is 64.05 mm., which is 64% of the focal length of 100.0 mm. of the objective and hence greater than 60%, as required; (b) the distance from L6 to L7 is 11.9 mm., that is 12% of the focal length and hence less than the 20% required; and (c) the focal lengths of the positive lenses L6 and L7 of the image-side subassembly are 161 mm., respectively 215 mm., and thus differ not more than 20% from twice the total focal length of the objective which is the maximum value of such difference we have discovered permitting of appropriate distribution of refractive index values between the two positive lenses of the image-side subassembly.

From the data given for the illustrative embodiment, it follows that the free diameters of the two positive lenses L6 and L7 of the image-side subassembly are large as compared to the diameters of the other lenses; they are 72.7 mm., respectively, 82.0 mm. It has developed that the marginal losses in brightness are very small when the diameter of the penultimate positive element, lens L6, is more than 80%, and that of the last positive element, lens L7, more than 90%, of the sharply focussed image diagonals, as below defined. When the diameters of the last named elements, L6 and L7, are larger than the diameters of the remaining lenses and have the stated relation to the image diagonals, all of the rays emerging from the third from last lens, L5, pass through the two last elements, L6 and L7, without any hindrance from their mountings and reach the image plane, that is, the two last lenses L6 and L7 result in no loss of light by vignetting or shadowing and flare. In the foregoing, the sharply focussed image diagonals correspond to at least that image angle given by the formula $$78 - 64 \cdot A \text{ in degrees} \qquad (1)$$

where A is the relative opening of the entire lens system. In the illustrative embodiment the relative opening is 1:1.8 resulting in an image angle of 42.5 degrees from Formula 1; and with the focal length of 100 mm., we thus have an image diagonal having a minimum value of 77 mm. Since the image diagonal of the illustrative embodiment is 83 mm., and therefore greater than the minimum fixed by theoretical considerations, the above values of the free diameters of 72.7 mm. and 82.0 mm. are respectively 93% and 106% of such minimum diagonal value, and well within the above given requirements.

Our computations have also shown that in objectives of the instant invention, the percentage loss in light intensity at an image corner element as compared to such intensity at the axis image element lies below the limit given by the formula $$35 + 50 \cdot A \qquad (2)$$

where A is the relative opening of the entire lens system. For a relative opening of 1:1.8 the maximum value of the light loss permissible given by this formula is 63%; in the illustrative embodiment it is only about 40%.

In the above described illustrative embodiment, the principal rays incident at different angles on the object-side subassembly emerge from the system substantially parallel, and the deviations from such parallel emergence are but a few degrees, namely some 4 degrees with an incidence angle of 20 degrees, and some 3°20′ with an incidence angle of 15°. By appropriate selection and arrangement of both subassemblies, namely by having the rear principal plane of the object-side subassembly coincide with the front focal plane of the image-side subassembly, the principal rays of all inclinations emerge exactly parallel to the optical axis. This results in a further decrease of the illumination losses at the image corner elements.

The three positive lenses of the two subassemblies may be of different types of glass; preferably, however, in the case of single lenses they are of glass having the same refractive index, as is the case in the illustrative embodiment. The refractive index for the D-line of the glasses of the positive lenses is preferably greater than 1.64.

It has further developed that correction of the image defects is particularly excellent when the negative elements comprise two cemented individual lenses and when the types of glass, of which they are made, have certain characteristics, namely, they differ in at least 15 units in their Abbe numbers and less than 0.05 in their indices of refraction, with preferably the index of refraction for the D-line of at least one of the negative individual lenses being greater than 1.60.

Our computations have further revealed that the correction for aberrations is simplified when $$\frac{r_5}{r_3} < \frac{r_3 + r_5}{f} < 0.8 \qquad (3)$$

In the illustrative embodiment, these values are 0.62 is less than 0.73 which is less than 0.8.

And finally our computations have shown that the thickness of the positive individual lenses of the first meniscus shaped negative element controls the distortion of the lens system to a marked degree when this lens thickness lies between 13% and 17% of the focal length of the entire system.

What we claim is:

1. An aberration corrected objective having a relative opening in excess of f:2.3 comprising an object-side subassembly of at least one positive lens and an image-side subassembly consisting of at least two positive lenses spaced from each other a distance less than 25% the magnitude of the total focal length of the objective, each of the latter positive lenses having a focal length of a magnitude lying between 20% below and 20% above twice the total focal length of the objective, and a pair of spaced negative meniscus lenses positioned between the object-side subassembly and the first positive lens in the direction of light passage of the image-side subassembly, the meniscus lenses having their concave surfaces facing each other, the spacing between the object-side subassembly and the first positive lens of the image-side subassembly being greater than 60% of the total focal length of the objective but less than infinite, and each of the positive lenses of both subassemblies is of a glass having a refractive index greater than 1.64.

2. An objective according to claim 1 in which the spacing between the object-side subassembly and the image-side subassembly is such that the rear principal plane of the object-side subassembly substantially coincides with the front focal plane of the image-side subassembly.

3. An objective according to claim 1 in which the iris diaphragm is positioned between the meniscus lenses.

4. An objective according to claim 1 in which the diameter of the free opening occupied by the imaging rays of the last positive lens of the image-side subassembly is between 90% and 106% of the magnitude of the sharply defined image diagonal, and the diameter of the free opening of the penultimate positive lens of the image-side subassembly is between 80% and 100% of said diagonal magnitude, the image diagonal corresponding to an image angle of at least $(78 - 64A)°$, where A is the relative opening of the entire objective.

5. An objective according to claim 1 in which the diameter of the free opening occupied by the imaging rays of the last positive lens of the image-side subassembly is between 90% and 106% of the magnitude of the sharply defined image diagonal, the diameter of the free opening of the penultimate positive lens of the image-side subassembly is between 80% and 100% of said image diagonal magnitude, the image diagonal corresponding to an image angle of at least $(78 - 64A)°$, and the percentage loss of brightness of the image corner elements as compared to the optical axis image element is not more than $(35 + 50A)\%$, where A is the relative aperture of the entire objective.

6. An aberration corrected objective according to claim 1 in which the positive lenses of both subassemblies are each a simple converging lens.

7. An aberration corrected objective according to claim 1 in which both meniscus negative lenses are composed of two single lenses cemented to each other and of glasses of which the Abbe numbers differ by more than 15 units and the indices of refraction differ by less than 0.05, the refractive index for at least one of the single lenses of the menisci being greater than 1.60, and in which the ratio of the sum of the radius of the front surface in the direction of ray passage and the radius of the rear surface of the first meniscus lens to the focal length of the objective is less than 0.80 but larger than the ratio of said rear surface to the radius of said front surface.

8. An aberration corrected objective according to claim 1 in which the meniscus lens nearest the object-side subassembly comprises a positive lens cemented to a meniscus lens, the thickness of the said positive lens being 13% to 17% of the total focal length of the entire objective.

9. An aberration corrected objective having a relative opening in excess of f:2.3 comprising in the direction of light passage a first positive lens of which the rear surface has a radius of the order of 6.2 times that of the front surface and a thickness of the order of 9% of the total focal length of the entire objective, a first cemented negative meniscus spaced at a distance of the order of 0.6% of said focal length from the first positive lens, the said first negative meniscus comprising a second positive lens of a thickness substantially 16% of the said focal length and the ratio of whose rear to front surface radii is of the order of 2.7 cemented to a first negative lens of a thickness substantially 5% of said focal length and the ratio of whose rear to front surface radii is of the order of 0.23, an iris diaphragm, a second cemented negative meniscus spaced from the first cemented negative meniscus a distance substantially 21% of said focal length, the said second negative meniscus comprising a second negative lens of a thickness substantially 4% of said focal length and the ratio of whose rear to front surface radii is of the order of 3.2 cemented to a third positive lens of a thickness substantially 16% of said focal length and a ratio of rear to front surface radii of the order of 0.44, the hollow concave surfaces of the first and second negative meniscuses facing each other, the said second positive lens, first and second negative lenses and third positive lens being of glasses of which the Abbe numbers differ by more than 15 units and whose indices of refraction do not differ by more than 0.05 with the index of refraction of at least one glass being greater than 1.60, a fourth positive lens spaced from the second negative meniscus a distance of the order of 0.6% of said focal length and of a thickness substantially 7.8% of said focal length and whose ratio of rear to front surface radii is of the order of 0.22, and a fifth positive lens spaced at a distance substantially 12% of said focal length from the fourth positive lens and of a thickness of the order of 10% of said focal length and whose ratio of rear to front surface radii is of the order of 0.95, the first, fourth and fifth positive lenses being of glass having the same index of refraction and preferably greater than 1.64 and of an Abbe number intermediate the range of the Abbe numbers of the glasses of the second positive, first and second negative, and third positive lenses.

10. A high intensity optical objective having numerical data substantially as follows, where $r$ is the radius of the lens surface with a plus value indicating the surface is convex to the object side and a minus value indicating it is concave thereto, $d$ is the lens thickens, $l$ is the spacing between lenses, $N_D$ is the index of refraction, $V$ is the Abbe number, and $\phi$ is the lens diameter, with the subscripts of $r$, $d$ and $l$ progressing in their order from the object side:

[Equivalent focal length=100]

| | | N | V | $\phi$ |
|---|---|---|---|---|
| $r_1=+ 70.7$ | $d_1= 9.05$ | 1.658 | 50.8 | 62.0 |
| $r_2=+435.0$ | $l_1= 0.60$ | | | |
| $r_3=+ 45.35$ | $d_2=16.50$ | 1.620 | 60.3 | 54.8 |
| $r_4=-122.9$ | $d_3= 4.80$ | 1.607 | 40.2 | |
| $r_5=+ 27.92$ | $l_2=21.10$ | | | |
| $r_6=- 32.45$ | $d_4= 4.20$ | 1.593 | 35.4 | 56.0 |
| $r_7=+104.2$ | $d_5=16.25$ | 1.623 | 56.9 | |
| $r_8=- 45.76$ | $l_3= 0.60$ | | | |
| $r_9=+591.0$ | $d_6= 7.80$ | 1.658 | 50.8 | 72.7 |
| $r_{10}=-129.5$ | $l_4=11.90$ | | | |
| $r_{11}=+290.0$ | $d_7=10.25$ | 1.658 | 50.8 | 82.0 |
| $r_{12}=-275.8$ | | | | |

References Cited in the file of this patent

UNITED STATES PATENTS

| | | |
|---|---|---|
| 2,019,985 | Lee | Nov. 5, 1935 |
| 2,379,392 | Warmisham | June 26, 1945 |
| 2,379,393 | Wynne | June 26, 1945 |
| 2,398,680 | Warmisham | Apr. 16, 1946 |

FOREIGN PATENTS

| | | |
|---|---|---|
| 647,830 | Germany | July 14, 1937 |
| 522,651 | Great Britain | June 24, 1940 |